US008280835B2

(12) United States Patent
Krishnan et al.

(10) Patent No.: US 8,280,835 B2
(45) Date of Patent: Oct. 2, 2012

(54) METHOD FOR AUTOMATED DISTRIBUTED DIAGNOSTICS FOR NETWORKS

(75) Inventors: Komandur R. Krishnan, Bridgewater, NJ (US); Hanan Luss, Marlboro, NJ (US); David F. Shallcross, Piscataway, NJ (US); Arnold L. Neidhardt, Middletown, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 793 days.

(21) Appl. No.: 12/362,298

(22) Filed: Jan. 29, 2009

(65) Prior Publication Data

US 2010/0192013 A1 Jul. 29, 2010

(51) Int. Cl.
*G06F 17/00* (2006.01)
*G06N 5/02* (2006.01)

(52) U.S. Cl. ........................................................ 706/47
(58) Field of Classification Search ........................ None
See application file for complete search history.

(56) References Cited

U.S. PATENT DOCUMENTS

| | | | |
|---|---|---|---|
| 5,661,668 A | 8/1997 | Yemini et al. | |
| 6,868,367 B2 | 3/2005 | Yemini et al. | |
| 7,171,585 B2 | 1/2007 | Gail et al. | |
| 2004/0248576 A1 * | 12/2004 | Ghiglino et al. | 455/445 |
| 2006/0195302 A1 | 8/2006 | Fijany et al. | |
| 2007/0061110 A1 | 3/2007 | Tafazoli et al. | |
| 2007/0226540 A1 | 9/2007 | Konieczny | |

OTHER PUBLICATIONS

'An efficient heuristic procedure for partitioning graphs': Kernighan, 1970, Bell systems technical journal 29 1970, pp. 291-307.*
'Event detection in sensor fields by adaptive distributed computations': Krishnan, 2009, IEEE, 978-1-4244-2787.*
'Distributed fault identificatio in telecommunication networks': Bouloutas, 1995, Journal of network and systems management, vol. 3, No. 3, 1995.*
International Search Report, dated Mar. 16, 2009.
B. Hendrickson and R. Leland, "A Multilevel Algorithm for Partitioning Graphs". Proceedings of Supercomputing'95, ACM, Dec. 1995.

(Continued)

*Primary Examiner* — Omar Fernandez Rivas
*Assistant Examiner* — Peter Coughlan
(74) *Attorney, Agent, or Firm* — Philip J. Feig (57) ABSTRACT

A method for distributed computations for fault-diagnosis in a system whose fault propagation model has deterministic couplings between faults and symptoms includes creating a 'relation graph' in which the nodes correspond to the potential faults, with two nodes connected by a 'relational link' if their corresponding faults have an observed symptom in common. Each relational link is assigned a weight equal to the sum, taken over the symptoms represented by the relational link, of the reciprocal of the number of distinct fault-pairs that produce each such symptom. The relation graph is then partitioned into several domains, while minimizing the number of cross-domain relational links, which correspond to cross-domain symptoms. In each domain, all the optimal local solutions to the domain's sub-problem are first determined, and then a combination is selected of the local solutions, one from each domain, that explains the maximum number of cross-domain symptoms, where the optimal solution is supplemented, if necessary, with additional faults to explain any remaining unexplained cross-domain symptoms, determining also a bound on the deviation from optimality of the global solution.

4 Claims, 4 Drawing Sheets

OTHER PUBLICATIONS

Kliger, et al., "A Coding Approach to Event Correlation". in Proc. 4th IEEE/IFIP International Symposium on Integrated Network Management (ISINM 1995), Santa Barbara, CA, USA, May 1995, pp. 266-277.

Bouloutas, et al., "Distributed Fault Identification in Telecommunication Networks". Journal of Network and Systems Management, Plenum Publishing Corporation, Sep. 1995, vol. 3, No. 3.

Steinder, et al., "Probabilistic Fault Diagnosis in Communication Systems Through Incremental Hypothesis Updating". Computer Networks, Elsevier B.V., 2004, pp. 537-562.

Steinder, et al., "Multidomain Diagnosis of End-to-End Service Failures in Hierarchically Routed Networks". IEEE Transactions on Parallel and Distributed Systems, IEEE, Mar. 2007, vol. 18, No. 3.

* cited by examiner

METHOD FOR AUTOMATED DISTRIBUTED DIAGNOSTICS FOR NETWORKS

CROSS-REFERENCE TO RELATED APPLICATIONS

This application claims the benefit of U.S. Provisional Application No. 61/062,718, filed on Jan. 29, 2008, which is incorporated by reference herein in its entirety.

FIELD OF THE INVENTION

The present invention relates to the diagnosis of faults in systems by means of inferences drawn from the symptoms produced by those faults. Specifically, the invention relates to distributed computations for fault-diagnosis carried out by partitioning the fault-to-symptom causality model of the system into computational domains and by coordinating the diagnoses obtained from the individual domains to produce a global diagnosis for the whole system.

BACKGROUND OF THE INVENTION

Modern societies depend on the smooth and error-free operation of large and complex technological systems, such as telecommunication networks and power plants. When failures affect the operation of such large systems, it is important to be able to diagnose the 'root cause' of the observed problems. Consider, as an example, a telecommunication network that is used to transport the traffic of different applications. It is a complex inter-connection of many elements, and hence, can fail in many different ways. The failure of a single element, like a transmission link, a router, a server, or a database could affect many network-functions and thus give rise to a multitude of "alarms", all correlated to the same failure. Similarly, since the successful operation of an application depends on many network elements, an "alarm" could have many different possible causes. Thus, in a complex system, many different symptoms could arise from the failure of a single element and many different element-failures can give rise to the same symptom.

The subject matter of the present inventions pertains to the class of fault diagnosis methods known as 'model-based', to denote the fact that they take as their starting point an analytical representation of the underlying Fault Propagation Model that specifies the causal relations between faults and symptoms in the system under consideration. A 'bipartite graph' is a convenient representation of the relationship of the Fault Propagation Model. In a bipartite graph there is a set of nodes, one for each object that could fail (and thereby become a 'fault'), and another set of nodes, one for each symptom or alarm that can appear in the system. An object-node f is connected to a symptom-node s by a link if failure of object f (i.e., fault f) causes symptom s to be observed (in the case of deterministic causation) or if there is a non-zero probability that fault f causes symptom s to be observed (in the case of probabilistic causation). It is assumed that the probability $p_f$ of the occurrence of each fault f is known and that the occurrences of the different faults are all independent events. The representation of a Fault Propagation Model by a bipartite graph is well-established in the literature.

The fault-diagnosis problem can be stated as follows: given that a set S of symptoms has been observed, determine the most probable set or sets of faults F whose occurrence would account for the observed symptoms S. If all faults are equally probable, the 'most probable' hypothesis is one that contains the smallest number of faults. If faults have different probabilities of occurrence, then the probability of occurrence of a given set of faults is the product of the probabilities of faults in the set and the product of the complement of the probabilities of faults not in the set.

In the most general terms, the task is to determine which of the $2^N$ subsets of the N objects are consistent with all the observed symptoms, and which among them have the highest probability of occurrence. Since the number of possible candidates for solution rises exponentially in N, the procedure of searching for a solution is not scalable, though, in practice, the effort might be reduced by the prior knowledge or assumption that there can be no more than n<<N simultaneous faults in the system (which limits the search to $$\binom{N}{n}$$

possibilities) or by special cases of the structure of the bipartite graph.

For example, in problems where the occurrence of multiple simultaneous faults is known, a priori, to be very rare, a method known as "SMARTS Event Management System Codebook" as described by S. Kliger, S. Yemini, Y. Yemini, D. Ohsie, and S. Stolfo, in "A Coding Approach to Event Correlation", Proceedings of the fourth international symposium on integrated network management, pp. 266-277, 1995, and in U.S. Pat. No. 5,661,668, entitled "Apparatus and Method for Analyzing and Correlating Events in a System using a Causality Matrix", issued Aug. 26, 1997 relies on associating a unique 'code' of symptoms with each of the fault-occurrences chosen for consideration in the system. Here, the bipartite graph of the fault-to-symptom mapping is expressed by an M×N matrix F of 1's and 0's, where M is the number of possible symptoms and N is the number of (independent) objects (which, upon failure, become faults), and the element $f_{ij}$ (in the deterministic case) is given by $$f_{ij} = \begin{cases} 1 & \text{if symptom } i \text{ is present when fault } j \text{ occurs} \\ 0 & \text{otherwise} \end{cases}$$

Thus, column j of F, say $f_j$, is a vector of alarms that is viewed as a "codeword" for fault j. The "codewords" for the different faults must be distinguishable one from another; otherwise, there would be faults that produce identical alarm vectors, which must, hence, be regarded as "equivalent". Instead of working with an entire column as a codeword, it is possible to work with a subset of the rows (symptoms) of F and still maintain the uniqueness of the codewords. On the assumption that there can be, at most, a single fault, in the absence of errors, the alarm vector either has all zeros or matches one of the codewords exactly. However, to guard against inexact matches due to erroneous or "lost" alarms, in selecting a subset of the symptoms to work with, one tries to produce codewords with a minimum pair-wise separation (Hamming distance) so that an alarm vector, when it fails to match any codeword exactly, can be assigned to the codeword to which it is closest.

M. Steinder and A. S. Sethi, in "Probabilistic fault diagnosis in communication systems through incremental hypothesis updating", Computer Networks 45, pp. 537-562, 2004, consider the diagnostic problem for the case when the coupling between objects and symptoms in the bipartite graph is allowed to be probabilistic, and present a Bayesian inference algorithm in which certain approximations are used to limit the number of computations for finding a solution.

As noted earlier, without assumptions that limit the number of possible simultaneous faults, the number of hypotheses to be considered in diagnosing the root cause of a set of observed symptoms grows exponentially in the number of potential faults (objects). This rate of growth in complexity limits the size of the problems that can be solved by means of direct, centralized computation. An approach to slowing the rate of growth of complexity of diagnostic calculations is to partition the problem in some fashion into a number of 'computational domains' such that the calculations for the sub-problem in each domain can be carried out in parallel, i.e., centralized computation is replaced with distributed computation in the domains. Some coordination might then be needed among the results from the domains in order to arrive at a solution to the overall problem.

U.S. Pat. No. 6,868,367, entitled "Apparatus and Method for Event Correlation and Problem Reporting", issued Mar. 15, 2005, describes the case of multiple domains, with the assumption that, in each domain, it is very rare to have more than one fault. The diagnostic method appears to consist of a 'pooling' of the solutions of the local domains. Other methods for coordinating such distributed computations, based on an exchange (either one-shot or iterative) of 'cost' information among the domains, have been proposed by A. T. Bouloutas, S. B. Calo, A. Finkel, and I. Katzela in "Distributed Fault Identification in Telecommunications Networks", Journal of Network and Systems Management. 1995; and by M. Steinder and A. S. Sethi, in "Multi-domain diagnosis of end-to-end service failures in hierarchically routed networks", IEE Transactions on Parallel and Distributed Systems, vol. 18, no. 3, pp. 379-392, March 2007.

SUMMARY OF THE INVENTION

The present invention comprises: (1) a method for partitioning the fault diagnosis problem into 'computational domains' in which the computations can proceed in parallel, (2) a method for determining all the optimal local solutions to the sub-problem in each individual domain in which cross-domain symptoms are ignored, and (3) a method of (a) finding a combination of local solutions, one from each domain, that maximizes the number of cross-domain symptoms explained, such a solution constituting an optimal global solution to the diagnosis problem in case all the cross-domain symptoms have been explained, or (b) in the case where unexplained cross-domain symptoms remain in method 3(a), finding a global solution by supplementing the combination of local solutions chosen in method 3(a) with additional faults to explain the residual cross-domain symptoms, determining also a bound on the deviation of the solution from optimality.

Partitioning the Fault Propagation Model

First, the bipartite representation of a fault propagation model is transformed into an associated abstract graph, called the 'relation graph' of the model. The relation graph is constructed as follows: each node of the relation graph corresponds to an object (potential fault), and two nodes are connected by a bi-directional 'relational link' if their corresponding objects, upon failure, produce a symptom in common. Note that a symptom that has a unique fault as its possible cause will not be represented in the relation graph. Since the occurrence of such a symptom at once establishes the occurrence of the corresponding fault, the diagnosis for such symptoms is immediately obtained. Each relational link is assigned a weight equal to the sum, taken over the symptoms represented by the relational link, of the reciprocal of the number of distinct fault-pairs that produce each such symptom.

Next, the relation graph is partitioned into several 'computational domains', with roughly equal numbers of nodes in each domain, while minimizing the number of relational links that bridge separate domains (which correspond to 'cross-domain' symptoms). Each domain includes only a subset of the objects (which, upon failure, are termed faults) and the symptoms they produce upon failure. Graph partitioning is a well-studied problem of graph theory, for which are various fast algorithms even for graphs with thousands of nodes. See, for example, B. Hendrickson, R. Leland, "A Multilevel Algorithm for Partitioning Graphs", Supercomputing 95, Proceedings of the IEEE/ACM SC95 Conference, 1995. In partitioning the relational graph, each relational link (which corresponds to one or more symptoms) is assigned a weight equal to the sum, taken over the symptoms represented by the relational link, of the reciprocal of the number of distinct object-pairs that produce each such symptom. This choice of weights is intended as an aid to achieving the objective of minimizing the number of cross-domain symptoms in the partition. The size of each domain (the number of objects assigned to it) is chosen to be the largest value for which computations for the local diagnosis in each domain can be carried out in a reasonable length of time by a centralized algorithm, i.e., one which works with knowledge of the portion of the fault propagation model pertaining to the faults and symptoms in the domain. The number of domains into which the problem needs to be partitioned thus depends on the largest problem size that can be handled in a single domain.

One could either obtain a fixed partitioning of the relation graph of the original bipartite model, comprising all the potential faults and their symptoms, or adapting the partitioning to the particular instance of the graph that comprises only the actually observed symptoms and all the faults that constitute their potential causes in each realized scenario. In the latter case, the relation graph that is sought to be partitioned into loosely-coupled domains corresponds to the actual observed symptoms in each scenario of the occurrence of faults and symptoms. Owing to the randomness in occurrences of faults, one expects, on the whole, that such an adaptive partitioning of the realized graph, matching the partitioning to the observed symptoms, offers a higher probability of being able to find a partition that minimizes the presence of cross-domain symptoms. Thus, an innovative element of our approach is to create virtual 'computational domains' for each realization of the fault propagation model, grouping faults into these domains solely for the sake of computational efficiency, with no necessary connection to the geographical location of the elements that, upon failure, become faults. Thus, our approach to distributed computation is based on the idea of arranging for a suitable domain-partition that minimizes the overlap between domains, which increases the likelihood of finding a provably optimal global solution by the mere selection of a combination of optimal local solutions of the individual domains.

Once a partition of a relation graph into domains has been obtained, the following algorithm is used to obtain a solution to the diagnosis problem.

First, each individual domain determines all its optimum local solutions, ignoring all of its cross-domain symptoms. If all faults have the same probability of occurrence, an optimal solution is a minimal set of faults that 'covers' (explains) all the observed local symptoms. This is a standard 'set covering' problem that can be solved by commercial integer programming solvers. This procedure is easily adapted to the case where faults have different probabilities of occurrence.

It should be noted here that if a partition of the potential faults into domains succeeds in creating isolated individual domains with no 'cross-domain' symptoms at all, then an optimum overall solution consists of the collection of the optimum local diagnoses, one from each domain. Each such collection is an optimal solution. In this special case of isolated domains, the overall global optimal solution is available once the local optimal solutions of all the domains are found.

If the partitioning of the relation graph into individual domains turns out to contain cross-domain symptoms, then a check is made to see whether a combination of optimal local solutions, one from each domain, can also 'cover' all the cross-domain symptoms. This is accomplished by solving a maximum set cover problem, i.e., by finding a combination of optimal local solutions, one from each domain that maximizes the number of cross-domain symptoms that are explained. If a collection of such optimal local solutions, one from each domain, obtained by ignoring cross-domain symptoms, nevertheless manages to explain all the cross-domain symptoms as well, then again, such a collection is a proven optimal global solution made up of local optimum solutions.

If unexplained cross-domain symptoms remain after solving the maximum set cover problem above, then, a 'central' manager solves the smaller problem of selecting additional faults to explain merely the residual unexplained cross-domain symptoms. This residual problem of the remaining unexplained cross-domain symptoms and the faults that could have been their potential causes, should generally be a much smaller problem than the original problem and is solved by application of the same method that is used to find local solutions in each individual, viz., by finding a minimal set of faults to explain the residual cross-domain symptoms. The final solution that is found after the solution of the residual problem may or may not be optimal, though it is not possible to make a definite statement one way or the other. However, what is known is how far it could deviate, in the worst case scenario, from an optimal solution. It is clear that whenever a solution to explain all the symptoms is found by a combination of local optimal solutions, then a global optimum solution has been found.

Thus, the innovation of the present invention consists of distributed computations implemented by means of partitioning the relation graph associated with the fault propagation model, determining all optimal local solutions, and finding a combination of local solutions, one from each domain, that provide a global solution that is either provably optimal or deviates from optimality at most by a known bound.

The present invention will be more clearly understood when the following description is read in conjunction with the accompanying drawings.

DETAILED DESCRIPTION

Figure 1:
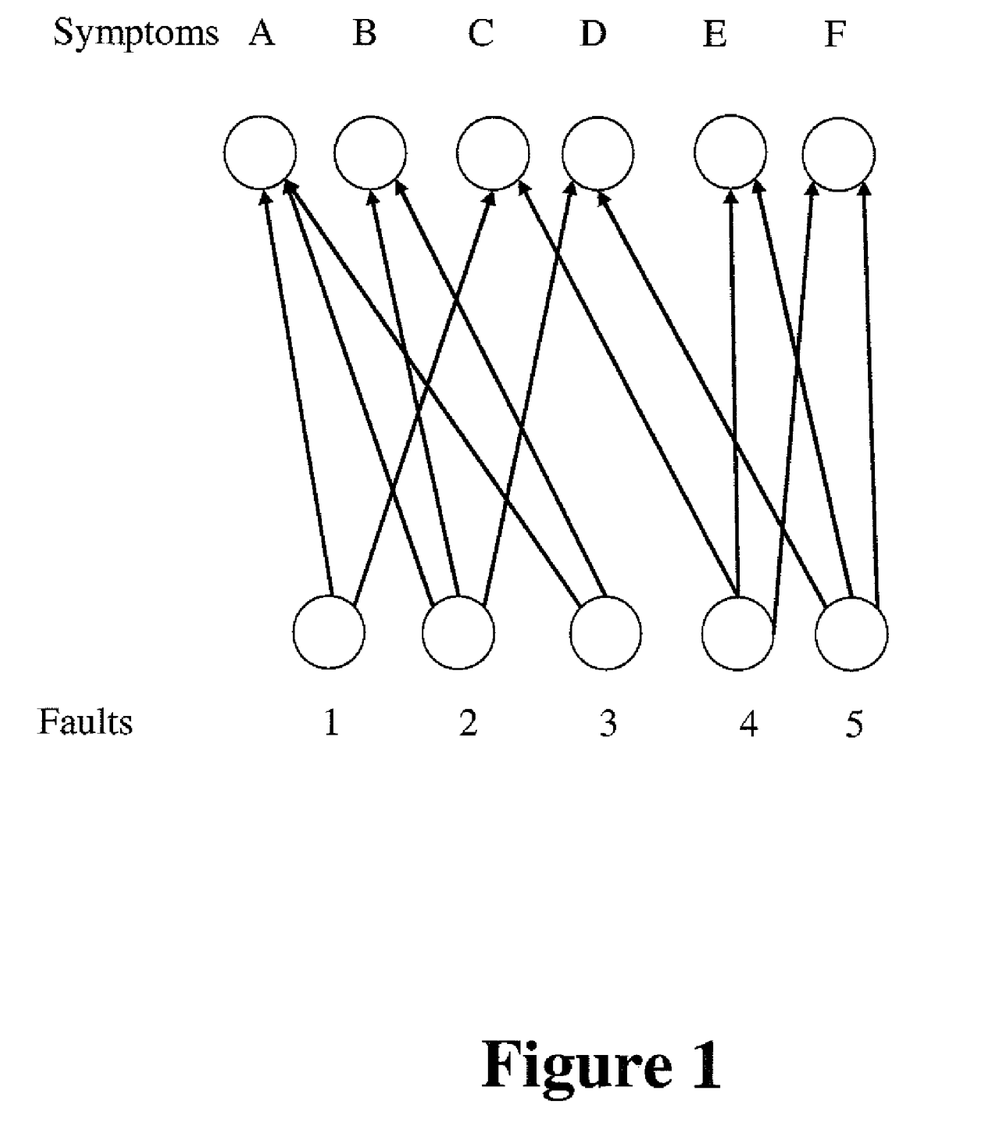
FIG. 1 is an example of a bipartite graph used to represent a fault propagation model, showing the correlation of potential faults to symptoms.

Referring now to the figures and to FIG. 1 in particular, there is shown the diagnostic problem represented by a bipartite graph. Nodes numbered 1, 2, 3, 4, and 5 represent five objects, each of which might fail (then becoming a fault) and nodes labeled A, B, C, D, E, and F which are six possible symptoms produced by the various faults. The directed links in the bipartite graph display the causal relation between objects and symptoms. For example, if Object 1 fails, symptoms A and C are activated. Symptom D could be activated by the failure of either Object 2 or Object 5, or both.

Figure 2:
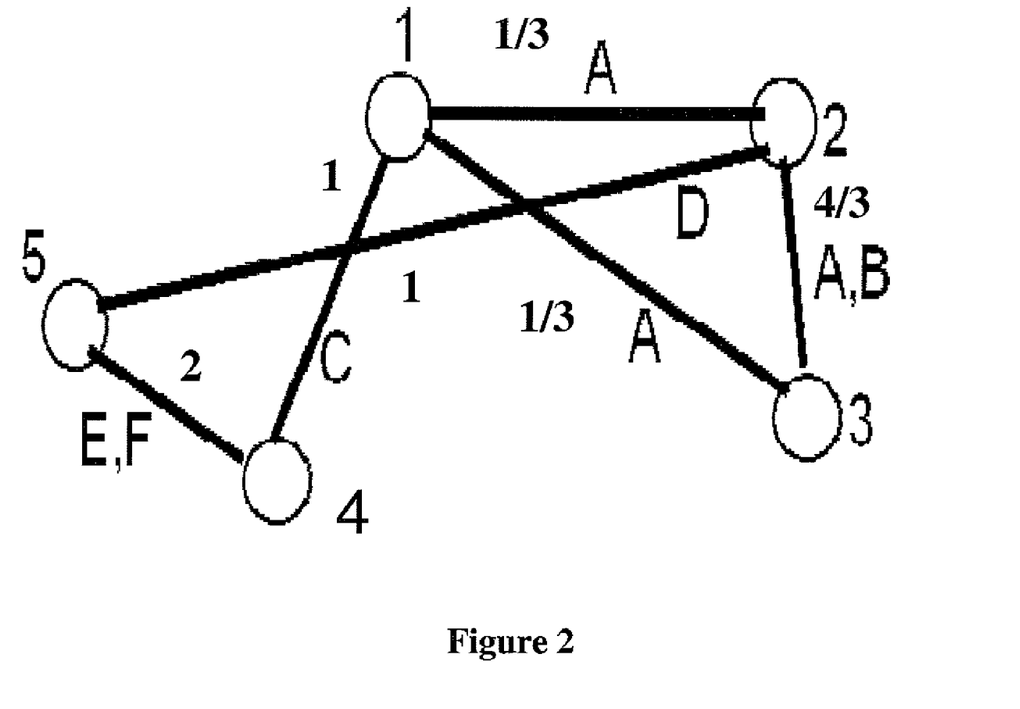
FIG. 2 shows the relation graph associated with the bipartite graph of FIG. 1.

Referring to FIG. 2, there is shown the transformation of a bipartite graph of FIG. 1 into its associated relation graph. The objects 1, 2, 3, 4, 5 appear as nodes in the relation graph. FIG. 1 shows, for example, that faults 1 and 2 both cause symptom A; hence, the corresponding nodes in the relation graph of FIG. 2 are connected by a 'relational link'. Similarly, since symptom A in FIG. 1 is also common to the object-pairs (1-3) and (2-3), these pairs are also connected by relational links. Note that the relational link between nodes 2 and 3 represents both the symptoms A and B that are common to the object-pair (2-3). Each relational link (which might correspond to one or more symptoms) is weighted by the sum, taken over the symptoms represented by the relational link, of the reciprocal of the number of distinct object-pairs that produce each such symptom. This choice of weights is intended as an aid to achieving the objective of partitioning the relation graph into a specified number of computational domains in order to minimize the number of cross-domain relational links. These weights are shown next to the relational links in FIG. 2. For example, the relational link for the object-pair (1-2) corresponding to symptom A has a weight of (1/3) since the same symptom is also caused by two other object-pairs (1-3) and (2-3). The relational link for the object-pair (2-3) corresponds to two symptoms A and B, of which A is caused by a total of three object-pairs (1-2), (1-3), and (2-3), while B is caused by the single object-pair (2-3). Thus, the relational link for the object-pair (2-3) has a weight of $$\left(\frac{1}{3} + 1\right) = 4/3.$$

Similar explanations apply to the weights assigned to the other relational links in FIG. 2.

Figure 3:
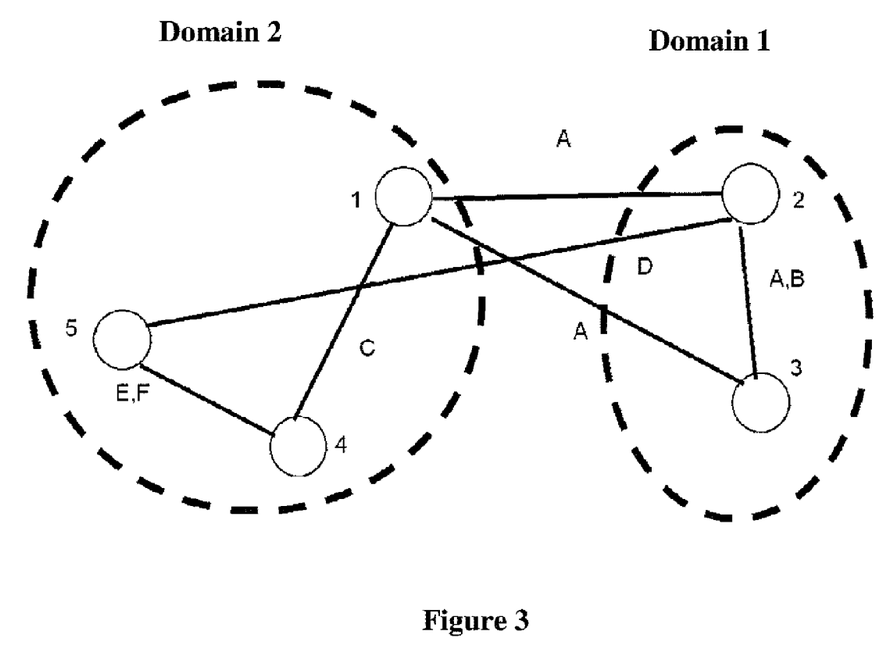
FIG. 3 shows a two-domain partition of the relation graph of FIG. 2.

FIG. 3 shows the partition of the relation graph of FIG. 2 into two domains of approximately the same number of nodes per domain. For this partitioning, symptoms A and D become 'cross-domain' symptoms (i.e., symptoms whose parent faults lie in different domains), while each of the other symptoms B,C,E, and F is a 'local' symptom (i.e., whose parent objects all lie within the same domain).

Figure 4:
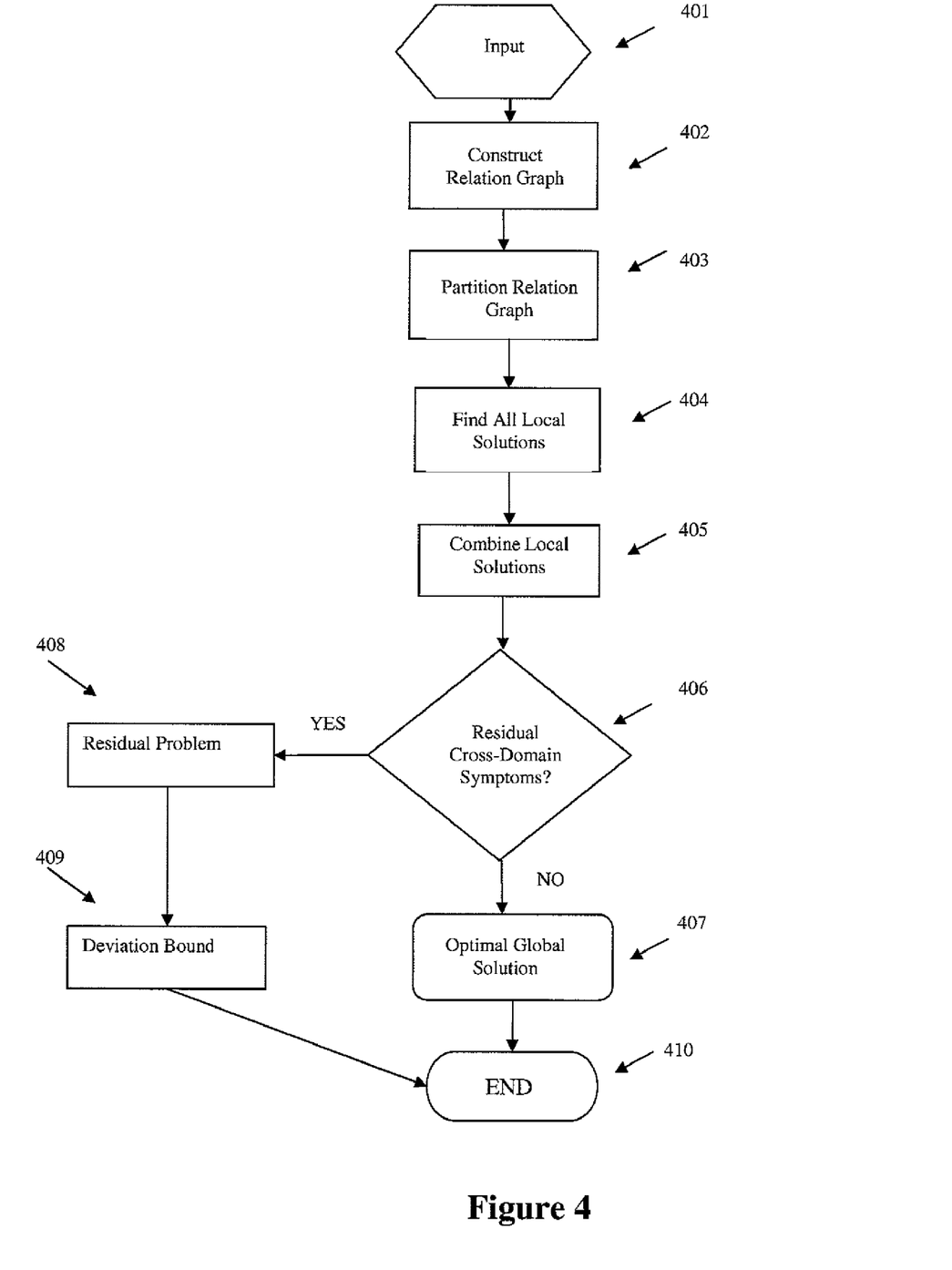
FIG. 4 is a flow chart of the diagnostic algorithm of the present invention.

FIG. 4 is a flow chart of the diagnostic algorithm of the present invention.

At input 401, the diagnostic problem is represented by a bipartite graph, such as that shown in FIG. 1.

In step 402, the bipartite-graph representation of the problem is transformed into its associated relation graph. An example of such transformation of a bipartite graph into its associated relation graph is shown in FIG. 2. Each relational link is weighted by the sum, taken over the symptoms represented by the relational link, of the reciprocal of the number of distinct object-pairs that produce each such symptom.

In step 403 the relation graph is partitioned into the required number of domains, determined by the maximum number of nodees to be assigned to each domain. As an example, FIG. 3 shows the optimal partition of the relation graph of FIG. 2 into two domains. For this partitioning, symptoms A and D become 'cross-domain' symptoms (i.e., symptoms whose parent objects lie in different domains), while each of the other symptoms B,C,E, and F is a 'local' symptom (i.e., whose parent objects all lie within the same domain).

At step 404, in each domain, all optimal solutions (solutions with minimal number of faults, for the case of equally probable faults) are found for just the local symptoms, ignoring all cross-domain symptoms. For the two-domain partition in FIG. 3, the following are the optimal local solutions:

Domain 1:
Local Symptom: B
Optimal Local Solutions: {Fault 2}, {Fault 3}
Domain 2:
Local Symptoms: C, E and F
Optimal Local Solution: {Fault 4}

Let $L_{opt}$=the sum of the number of faults in optimal local solutions from all the domains, one from each domain. For FIG. 3, $L_{opt}$=2, comprising one fault from Domain 1 and one fault from Domain 2.

In step 405, a combination of local solutions, one from each domain, that explains the largest number of cross-domain symptoms is found by solution of a 'maximum set cover' problem. In FIG. 3, there is precisely one combination of local solutions that explains both the cross-domain symptoms A and D: Fault 2 from Domain 1 and Fault 4 from Domain 2.

In step 406, if a combination of optimal local solutions, one from each domain, obtained in step 405 can explain all the cross-domain symptoms as well, each such combination is a provably optimal global solution, and the diagnostic problem is solved at step 407. In the Example of FIG. 3, {Fault 2, Fault 4} is the unique global solution. That is, there are no residual cross-domain symptoms. Then the algorithm ends at step 410.

If the maximum set cover problem leaves one or more residual cross-domain symptoms unexplained, the algorithm proceeds to step 408.

If unexplained cross-domain symptoms remain after solving the maximum set cover problem at step 405, a minimum number of additional faults are selected to explain only the residual cross-domain symptoms. This residual problem in step 408, comprising the remaining unexplained cross-domain symptoms and the objects that could have been their causes, is solved by application of the same algorithm that is used in step 404, viz., finding a minimal set of faults to explain the residual cross-domain symptoms. In this case, the final solution-set is these additional faults together with the faults chosen in the maximum set cover solution that is found in step 405.

Let $G_{final}$=total number of faults in final solution.

The final solution found in step 408 may or may not be optimal. However, what is known is how far the final solution could deviate, in the worst case scenario, from an optimal global solution.

Let $G_{opt}$=total number of faults in an optimal global solution. Then, the following bound holds:

$$L_{opt} \leq G_{opt} \leq G_{final}.$$

The deviation bound is found and the algorithm ends at step 410.

In the example shown in FIG. 1 that has been described above, the failure-probabilities of all the objects were assumed to be equal, which implies that an optimal solution is one that explains all the observed symptoms and contains the fewest number of faults. The case where the objects have different failure-probabilities is readily handled as follows.

Let N=number of objects.

Let $p_k$=failure-probability of object $k, k=1, \ldots, N$, with $0<p_k<1$ (excluding the cases $p_k$=0 (object that never fails) and $p_k$=1 (object always in the failed state) as cases that do not need to be 'diagnosed').

A solution which consists of the objects $(k_1, k_2, \ldots, k_m)$ (and excludes the objects $(k_{m+1}, k_{m+2}, \ldots, k_n)$), has a probability given by $$\Pi_{j=1}^{m} p_{k_j} \Pi_{j=m+1}^{n} (1-p_{k_j}).$$

In comparing the relative probabilities of such sets, the form of the expressions can be simplified by dividing by the common product $\Pi_{j=1}^{n} (1-p_{k_j})$. Thus, a solution consisting of the objects $(k_1, k_2, \ldots, k_m)$, is assigned the metric H, defined by:

$$H(k_1, k_2, \ldots, k_m) \triangleq \prod_{j=1}^{m} \frac{p_{k_j}}{1-p_{k_j}}$$

Then, an optimal solution is one which has the smallest value of H.

If the probabilities $p_k$ can assume any value in the interval (0, 1), it is highly unlikely for two solutions to have exactly the same value of H, and thus highly unlikely that any domain will have more than a single optimal 'solution'. However, keeping in mind the difficulty of assigning precise values to the failure-probabilities in actual systems, it is perhaps more realistic to assume that the failure-probabilities only take values from a limited set (such as values corresponding to 'low, 'medium', or 'high' failure-probability). Such a discrete set of values allows for multiple local solutions to exist in the domains, from which a combination can then be selected to maximize the number of cross-domain symptoms that are explained.

System and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

While there has been described and illustrated global fault-diagnosis in systems, it will be apparent to those skilled in the art that variations and modifications are possible without deviating from the broad teachings and scope of the present invention which shall be limited solely by the scope of the claims appended hereto.

What is claimed is:

1. A method of distributed computations for diagnosing faults in a system for which a fault-to-symptom correlation map is specified by a fault propagation model including a specification, for each potential fault, of a set of symptoms that will be observed if a fault occurs, comprising the steps of:

translating the fault-to-symptom correlation map into an abstract relation graph in which nodes represent potential faults and a link between two nodes indicates that the corresponding faults produce one or more symptoms in common;

partitioning the relation graph into a set of computational domains, thus obtaining a partition of the nodes among the domains, each domain including a set of nodes assigned to a respective domain and a set of local symptoms that either have both their end-nodes in the same domain or cross-domain symptoms that have only one end-node in a domain;

determining all optimal solutions to the local diagnosis problem in each domain by finding the most probable set of faults in each domain that can explain all the local symptoms of each domain, disregarding the presence of cross-domain symptoms;

determining a combination of the optimal local solutions of the domains, composed of one solution from each domain, that maximizes the number of cross-domain symptoms explained by the faults chosen in the combination;

if all cross-domain symptoms are explained by the combination of optimal local solutions, the union of the faults in all the local solutions in the combination represents an optimal global solution;

if there remain unexplained cross-domain symptoms, determining an optimal solution to the residual diagnosis problem by finding additional faults to explain the remaining cross-domain symptoms, and completing the global solution by adding the additional faults to the faults in all the selected combinations of optimal local solutions, and computing a bound on the possible deviation of the selected solution from optimality given by the difference between the number of faults in the solution and the total number of faults in all the optimal local solutions determined for each individual domain;

wherein translating the fault-to-symptom correlation map into an abstract relation graph includes the step of assigning to each relational link a weight equal to the sum, taken over the symptoms represented by the relational link, of the reciprocal of the number of distinct fault-pairs that produce each such symptom.

2. A method of distributed computations for diagnosing faults in a system for which a fault-to-symptom correlation map is specified by a fault propagation model including a specification, for each potential fault, of a set of symptoms that will be observed if a fault occurs, comprising the steps of:

translating the fault-to-symptom correlation map into an abstract relation graph in which nodes represent potential faults and a link between two nodes indicates that the corresponding faults produce one or more symptoms in common;

partitioning the relation graph into a set of computational domains, thus obtaining a partition of the nodes among the domains, each domain including a set of nodes assigned to a respective domain and a set of local symptoms that either have both their end-nodes in the same domain or cross-domain symptoms that have only one end-node in a domain;

determining all optimal solutions to the local diagnosis problem in each domain by finding the most probable set of faults in each domain that can explain all the local symptoms of each domain, disregarding the presence of cross-domain symptoms;

determining a combination of the optimal local solutions of the domains, composed of one solution from each domain, that maximizes the number of cross-domain symptoms explained by the faults chosen in the combination;

if all cross-domain symptoms are explained by the combination of optimal local solutions, the union of the faults in all the local solutions in the combination represents an optimal global solution;

if there remain unexplained cross-domain symptoms, determining an optimal solution to the residual diagnosis problem by finding additional faults to explain the remaining cross-domain symptoms, and completing the global solution by adding the additional faults to the faults in all the selected combinations of optimal local solutions, and computing a bound on the possible deviation of the selected solution from optimality given by the difference between the number of faults in the solution and the total number of faults in all the optimal local solutions determined for each individual domain;

wherein the step of finding an optimal solution is finding a set of faults $(k_1, k_2, \ldots, k_m)$ that accounts for all the symptoms to be explained and has the smallest metric $H(k_1, k_2, \ldots, k_m)$, where $$H(k_1, k_2, \ldots, k_m) \triangleq \prod_{j=1}^{m} \frac{p_{k_j}}{1-p_{k_j}},$$

and where $p_{k_j}$=the prior probability of occurrence of fault $k_j$, $j=1,2,\ldots,m$.

3. A non-transitory computer readable medium having computer readable program for operating on a computer for diagnosing faults in a system for which a fault-to-symptoms correlation map is specified by a fault propagation model including a specification, for each potential fault, of a set of symptoms that will be observed if a fault occurs, said program comprising instructions that cause the computer to perform the steps of:

translating the fault-to-symptom correlation map into an abstract relation graph in which nodes represent potential faults and a link between two nodes indicates that the corresponding faults produce one or more symptoms in common;

partitioning the relation graph into a set of computational domains, thus obtaining a partition of the nodes among the domains, each domain including a set of nodes assigned to a respective domain and a set of local symptoms that either have both their end-nodes in the same domain or cross-domain symptoms that have only one end-node in a domain;

determining all optimal solutions to the local diagnosis problem in each domain by finding the most probable set of faults in each domain that can explain all the local symptoms of each domain, disregarding the presence of cross-domain symptoms;

determining a combination of the optimal local solutions of the domains, composed of one solution from each domain, that maximizes the number of cross-domain symptoms explained by the faults chosen in the combination;

if all cross-domain symptoms are explained by the combination of optimal local solutions, the union of the faults in all the local solutions in the combination represents an optimal global solution;

if there remain unexplained cross-domain symptoms, determining an optimal solution to the residual diagnosis problem by finding additional faults to explain the remaining cross-domain symptoms, and completing the global solution by adding the additional faults to the faults in all the selected combinations of optimal local solutions, and computing a bound on the possible deviation of the selected solution from optimality given by the difference between the number of faults in the solution and the total number of faults in all the optimal local solutions determined for each individual domain;

wherein translating the fault-to-symptom correlation map into an abstract relation graph includes the step of assigning to each relational link a weight equal to the sum, taken over the symptoms represented by the relational link, of the reciprocal of the number of distinct fault-pairs that produce each such symptom.

4. A non-transitory computer readable medium having computer readable program for operating on a computer for diagnosing faults in a system for which a fault-to-symptoms correlation map is specified by a fault propagation model including a specification, for each potential fault, of a set of symptoms that will be observed if a fault occurs, said program comprising instructions that cause the computer to perform the steps of:

translating the fault-to-symptom correlation map into an abstract relation graph in which nodes represent potential faults and a link between two nodes indicates that the corresponding faults produce one or more symptoms in common;

partitioning the relation graph into a set of computational domains, thus obtaining a partition of the nodes among the domains, each domain including a set of nodes assigned to a respective domain and a set of local symptoms that either have both their end-nodes in the same domain or cross-domain symptoms that have only one end-node in a domain;

determining all optimal solutions to the local diagnosis problem in each domain by finding the most probable set of faults in each domain that can explain ill the local symptoms of each domain, disregarding the presence of cross-domain symptoms:

determining a combination of the optimal local solutions of the domains, composed of one solution from each domain, that maximizes the number of cross-domain symptoms explained by the faults chosen in the combination;

if all cross-domain symptoms are explained by the combination of optimal local solutions, the union of the faults in all the local solutions in the combination represents an optimal global solution;

if there remain unexplained cross-domain symptoms, determining an optimal solution to the residual diagnosis problem by finding additional faults to explain the remaining cross-domain symptoms, and completing the global solution by adding the additional faults to the faults in all the selected combinations of optimal local solutions, and computing a bound on the possible deviation of the selected solution from optimality given by the difference between the number of faults in the solution and the total number of faults in all the optimal local solutions determined for each individual domain;

wherein the step of finding an optimal solution is finding a set of faults $(k_1, k_2, \ldots, k_m)$ that accounts for all the symptoms to be explained and has the smallest metric $H(k_1, k_2, \ldots, k_m)$, where $$H(k_1, k_2, \ldots, k_m) \stackrel{\Delta}{=} \prod_{j=1}^{m} \frac{p_{k_j}}{1 - p_{k_j}},$$

and where $p_{k_j}$=the prior probability of occurrence of fault $k_j$, $j = 1, 2, \ldots, m$.

* * * * *

UNITED STATES PATENT AND TRADEMARK OFFICE
CERTIFICATE OF CORRECTION

PATENT NO. : 8,280,835 B2  
APPLICATION NO. : 12/362298  
DATED : October 2, 2012  
INVENTOR(S) : Krishnan et al.

Page 1 of 1

It is certified that error appears in the above-identified patent and that said Letters Patent is hereby corrected as shown below:

On the Title Page, in item (56), under "OTHER PUBLICATIONS", in Column 2, Line 5, delete "identificatio" and insert -- identification --, therefor.

In the Specification

In Column 3, Line 33, delete "IEE" and insert -- IEEE --, therefor.

In Column 6, Line 64, delete "nodees" and insert -- nodes --, therefor.

In the Claims

In Column 12, Line 6, in Claim 4, delete "ill" and insert -- all --, therefor.

Signed and Sealed this
Fourteenth Day of April, 2015

Michelle K. Lee
*Director of the United States Patent and Trademark Office*